United States Patent [19]
Day

[11] 3,932,971
[45] Jan. 20, 1976

[54] WINDOW CONSTRUCTION
[76] Inventor: Ralph K. Day, 307 W. Harrison Ave., Maumee, Ohio 43537
[22] Filed: May 21, 1973
[21] Appl. No.: 361,989

[52] U.S. Cl. ................................................. 52/171
[51] Int. Cl.² .......................................... E06B 7/12
[58] Field of Search ............ 52/171, 172, 656, 399, 52/398, 400, 616, 304

[56] References Cited
UNITED STATES PATENTS

| | | | |
|---|---|---|---|
| 1,852,661 | 4/1932 | Larkin | 52/171 |
| 1,856,008 | 4/1932 | Warren | 52/398 |
| 1,913,205 | 6/1933 | Lenhart | 52/172 |
| 1,956,628 | 5/1934 | Rutishauser | 52/616 |
| 2,015,808 | 10/1935 | Miller | 52/1 |
| 2,057,730 | 10/1936 | Moderau | 52/397 |
| 2,083,622 | 6/1937 | Summers | 52/304 X |
| 2,168,216 | 8/1939 | Kennedy | 52/171 |
| 2,348,297 | 5/1944 | Huddle | 52/398 |
| 2,354,341 | 7/1944 | Verhagen | 52/399 |
| 2,565,937 | 8/1951 | Verhagen | 52/304 |
| 2,667,951 | 2/1954 | Gall | 52/399 |
| 2,756,467 | 7/1956 | Etling | 52/304 |
| 2,918,708 | 12/1959 | Sharp | 52/397 |
| 3,128,509 | 4/1964 | Stotz | 52/656 |
| 3,212,179 | 10/1965 | Koblensky | 52/398 |

FOREIGN PATENTS OR APPLICATIONS

| | | | |
|---|---|---|---|
| 900,766 | 7/1962 | United Kingdom | 52/398 |

*Primary Examiner*—John E. Murtagh
*Attorney, Agent, or Firm*—David H. Wilson

[57] ABSTRACT

A window construction containing two or more panes of glass with an enclosed air space therebetween and means for mounting the panes to effect a seal therebetween despite differential expansion or contraction due to temperature and barometric pressure changes. Gas directing means are provided for effecting an efficient flushing of the enclosed space between the panes of glass. Pressure equalizing means are provided for equalizing the internal gas pressure within the enclosed space with the atmosphere.

3 Claims, 6 Drawing Figures

U.S. Patent Jan. 20, 1976 Sheet 2 of 3 3,932,971
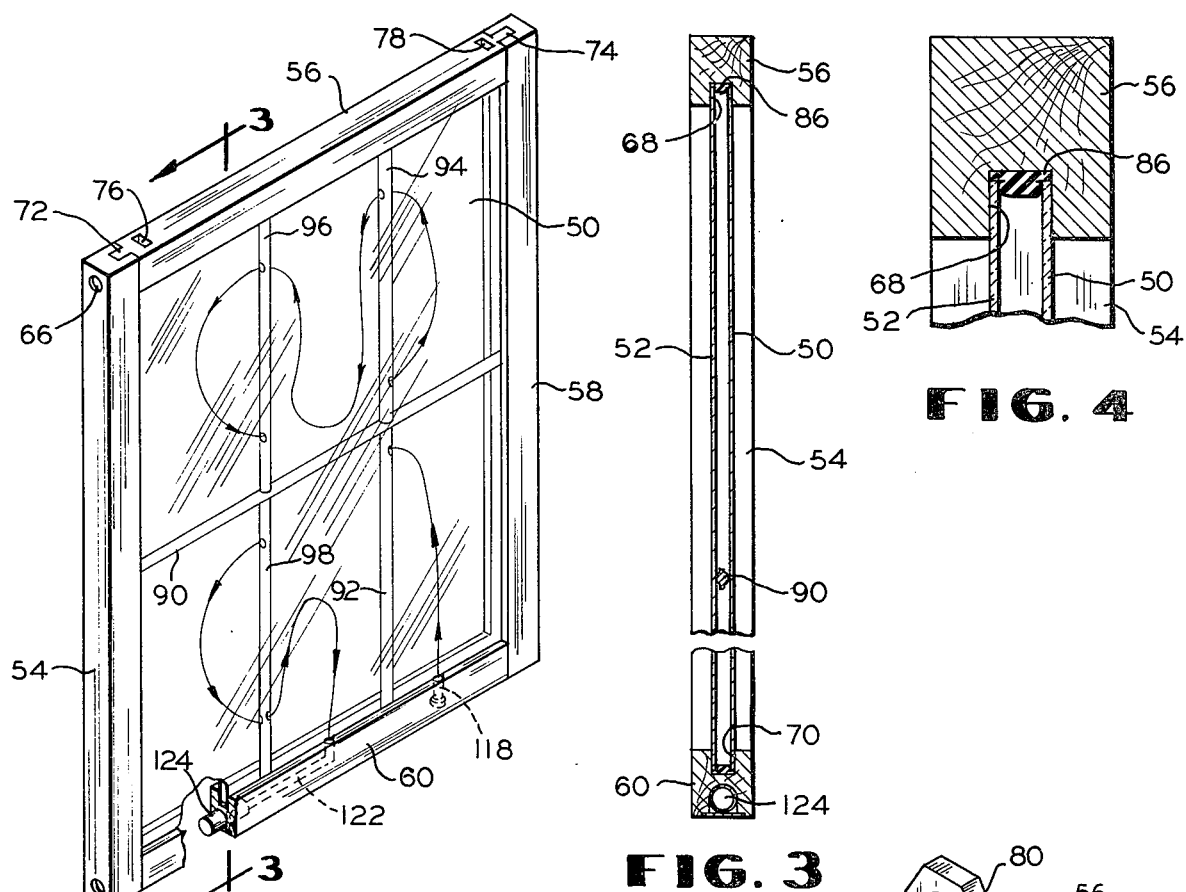
FIG. 2
FIG. 3
FIG. 4
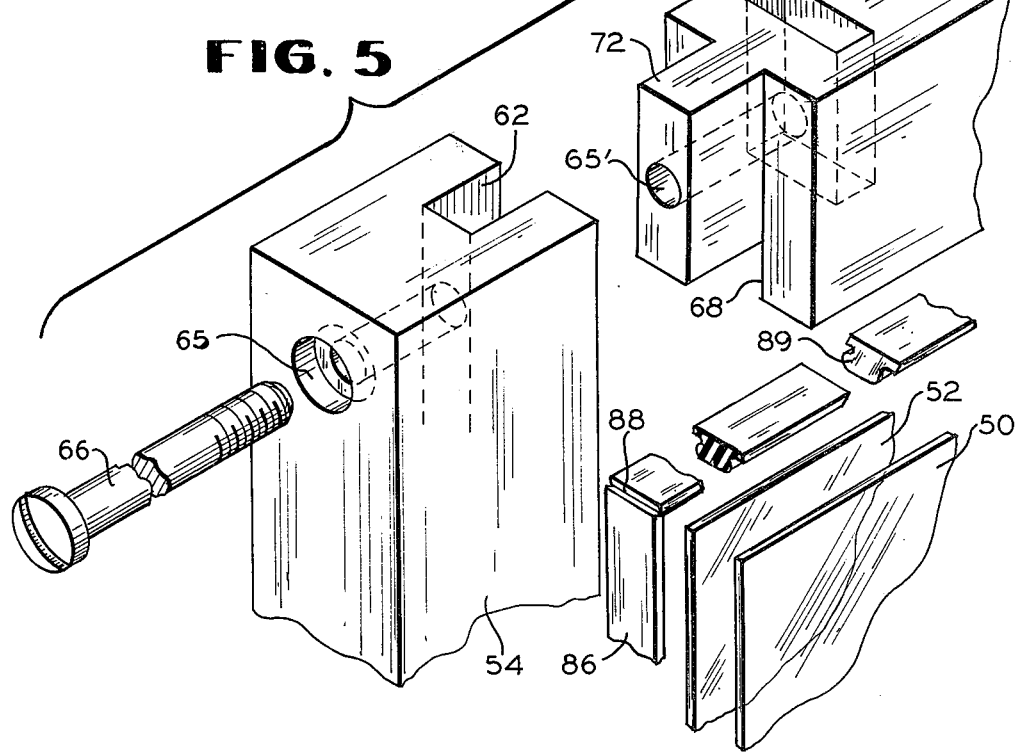
FIG. 5

WINDOW CONSTRUCTION

BACKGROUND OF THE INVENTION

The use of double panes of glass and even triple panes of glass in order to provide insulation against heat and noise is well known. Such windows comprise two or more parallel panes of glass, usually mounted in an elastomeric material such as rubber, for example. That is to say, a strip of rubber material is disposed between the panes of glass at their edges, the rubber on the outside of said edges and below said edges. Means for compressing the rubber so as to seal the glass panes therein and prevent air from leaking into or out of the space between the panes is also provided.

In principal, the idea is extremely simple, however in order to be effective as an insulating device, it is necessary that the dead air space between the panes of glass is effectively sealed. Not only is the insulating value of such windows dependent upon the maintenance of the tight seal, but in addition, visibility also depends upon it. For if moisture condenses on the inner surface of the glass, or if a film of grease or dirt accumulates thereon, visibility will obviously be adversely affected if not altogether destroyed. And since it is often impractical to clean the surfaces, it is clear than an effective type seal is vital.

A number of attempts have been made from time to time to provide a satisfactory solution to the problem. These have in general involved the use of rubber sealing strips such as gaskets, with various means for compressing the gaskets against the panes. Experience, however, shows that such methods of this type as are presently known cannot provide sufficiently uniform pressure to provide an effective airtight seal.

In the case of a relatively loose storm window of the conventional type, some reduction in heat loss is achieved. There is no significant problem of condensation of moisture in such a case, because there is so much circulation between the ambient air and the space between the panes that no significant difference in humidity can exist for an extended period of time. However, the dirt problem is very severe, because of the entry of such large volumes of air causes a rapid deposition of a film of grease or dirt on the inner surfaces of the panes. At the end of a year or so, cleaning becomes imperative. If this is a physical impossibility, or substantially so, as in many cases for example in office buildings, or in non-slidable "picture windows," the results are extremely unsatisfactory. In such cases in fact, conventional storm windows really cannot be used; multipane insulating windows are required.

The use of a conventional rubber sealing strip in the normal way, that is, without special efforts to achieve uniform compression, substantially reduces the circulation between the ambient air and the space between the panes. One result is thus that the insulating effectiveness may reach a reasonably good level. Another is that the dirt may take roughly twice as long to accumulate between the panes; however, when it accumulates, the situation is just as unsatisfactory as the case of an ordinary storm window. In other respects, the situation may readily become intolerable, that is condensation of moisture between the panes. If humid air gets into the space between the panes, and the ambient temperature drops, condensation of moisture occurs between the panes and, since the circulation between the ambient air and the space between the panes is slow, the window may remain "fogged" for very substantial periods of time. Thus, in order to decrease the dirt problem, one finds that one has introduced condensation problems. All in all, therefore, one has not achieved a solution to the problem of maintaining good visibility conditions.

The next step in the evolution of insulating windows has been the introduction of factory sealed windows. These are the first true insulating windows. The space between the panes is truly evacuated and the insulating quality thereof is high. The dirt and condensation problem is minimized but still exists. The difficulties with these windows are the extremely high first cost, high insurance cost, and expense and difficulty of repair of replacement. The fact that factory fabricated insulating windows can be purchased only in certain specific standard sizes also places limitations in design, especially when curved windows are involved.

The fact that such expensive solutions have nevertheless found very substantial commercial success clearly indicates that the problem itself, that is obtaining good insulating quality without visibility impairment, is a pressing problem and a problem of great commercial importance, and one for which no obvious answer exists.

Thus, there remains a problem of providing a seal as good as presently possible only with factory fabricated insulating windows, which is at the same time inexpensive, readily adapted to any size or shape of window including curved windows, and which can be installed and repaired at the job site instead of requiring factory fabrication.

Of course, airtight seals are well known in technology, but the problem in connection with the insulating windows is to obtain a seal which is not only effective, but also extremely simple in design and installation, and extremely low in cost. Complicated construction may make excellent airtight seals for scientific and industrial apparatus, but have no place in the construction of buildings, or in vehicles such as automobiles, buses, trains, and airplanes, for simplicity is required.

The difficulties which must be overcome in the solution of this problem include the following:

1. Considerable force must be necessary to make a tight seal, but glass panes must not be broken nor stressed so that the glass panes might break upon a temperature change or additional stress.

2. It is not sufficient to provide an excessively large force at some points and inadequate force elsewhere. "Averages" are not what counts here, but rather a uniform seal around the peripheral inner edges of the adjacent surfaces of the glass panes.

3. Expansions and contractions caused by temperature variations with seasonal changes and by pressure variations with changes in elevation, for example during shipment, must be accounted for without causing breakage on one hand and/or air leakage on the other.

SUMMARY OF THE INVENTION

The above problems have been solved by window construction containing two or more panes of glass utilizing a sealing member which is under sufficient uniform pressure to produce a substantially airtight seal between adjacent panes of glass despite variations in atmospheric temperature and pressure.

An object of the invention is to produce a multipaned window construction which can be readily erected on a construction site.

Another object of the invention is to produce a multipaned window construction wherein the moisture content in the space between adjacent panes of glass is automatically removed.

Still another object of the invention is to produce a multipaned window construction with means to equalize internal gas pressure with atmospheric pressure over a range of changes of atmospheres to avoid pressure differentials which would tend to cause entry of atmosphere within the interior of the windows.

A further object is to produce a multipaned window construction with means to direct the path of a flushing gas to minimize the amount of flushing gas needed and the time required to effect the flushing operation.

BRIEF DESCRIPTION OF THE DRAWINGS

The above, as well as other objects and advantages of the invention, will become readily apparent to one skilled in the art from reading the following detailed description of an embodiment of the invention when considered in the light of the accompanying drawings, in which:

FIG. 2 is a perspective view of a double glazed window construction embodying additional features of the invention not illustrated in the embodiment of FIG. 1;

FIG. 3 is a sectional view of the structure illustrated in FIG. 2 taken along line 3—3 thereof;

FIG. 4 is an enlarged fragmentary view in section illustrating the relative disposition of the frame, panes of glass, and the sealing strip;

FIG. 5 is an enlarged fragmentary exploded view of a corner of the window frame of the invention showing the threaded clamping means for drawing the windows together in assembled form.

DETAILED DESCRIPTION OF THE PREFERRED EMBODIMENTS

Figure 1:
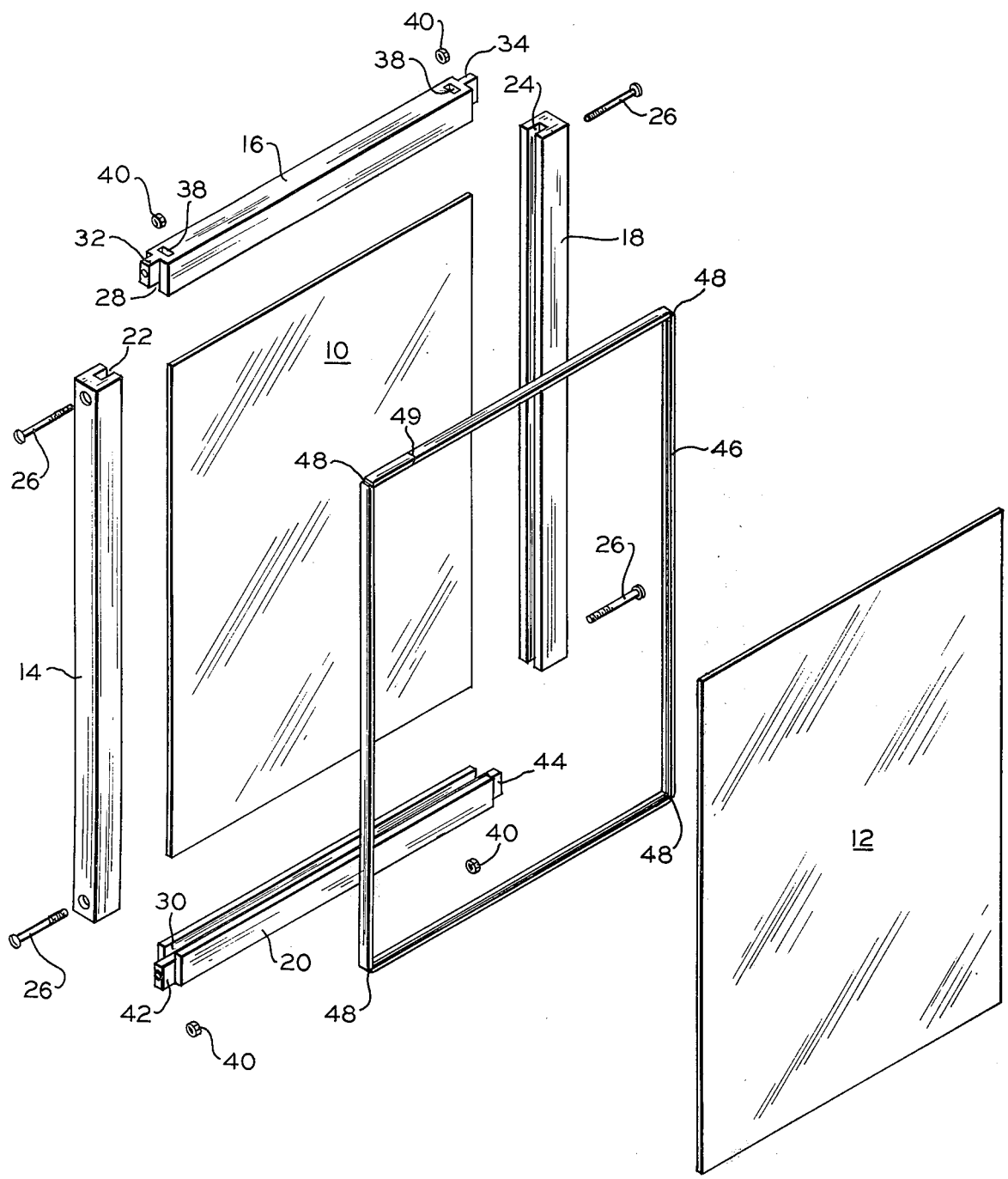
FIG. 1 is an exploded perspective view of a double glazed window construction embodying features of the present invention.
Figure 6:
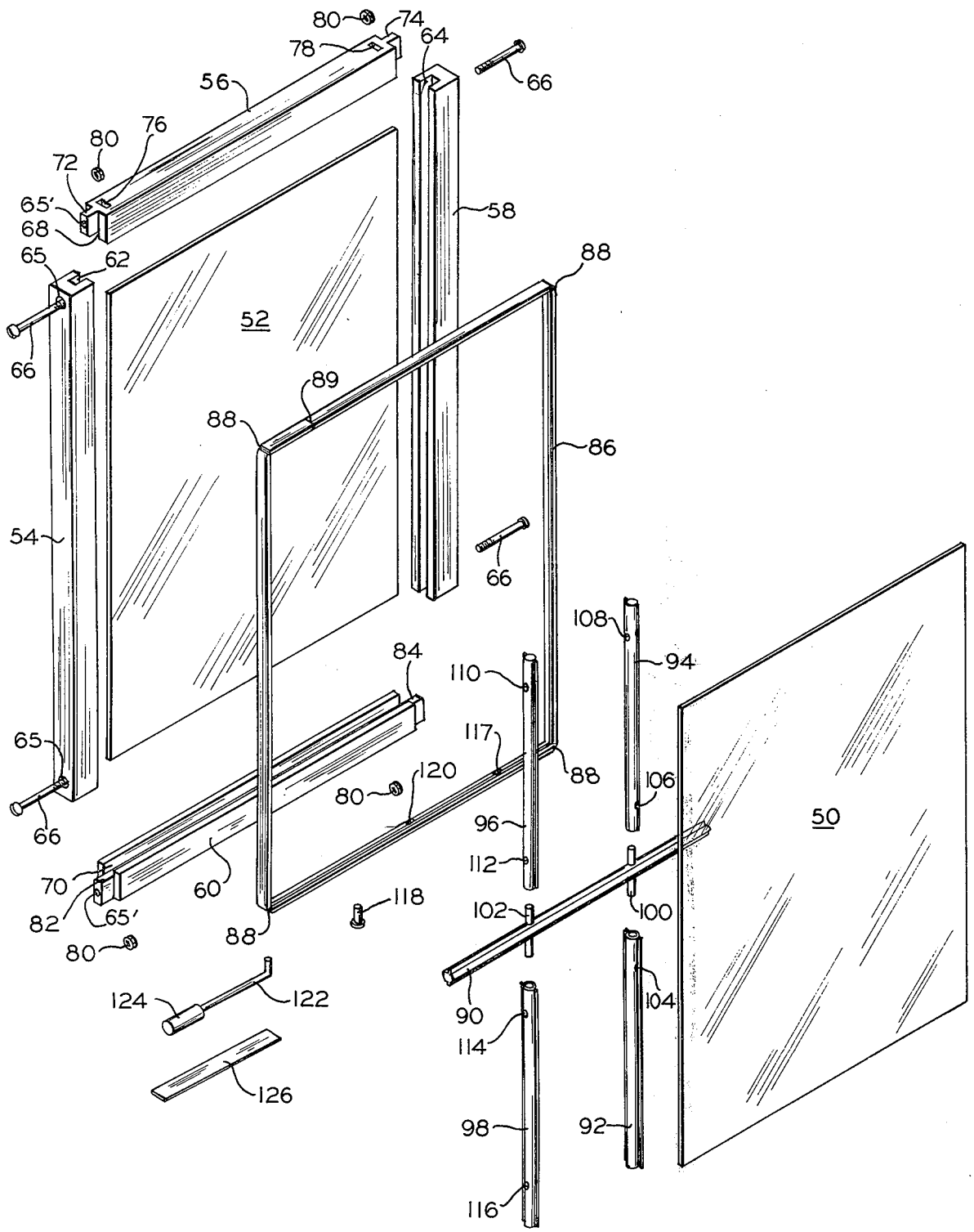
FIG. 6 is an exploded view of the window construction specifically illustrated in FIGS. 2 through 5.

Referring to FIG. 1, there is shown a window construction preparatory to the final assembly. The window construction includes a pair of panes of glass 10 and 12 which are of substantially identical dimensions. Many states have passed legislation requiring that glass used in openings which have been defined as hazardous areas such as patios, doors and windows must be safety or tempered glass. Accordingly, the type of glass utilized for the panes 10 and 12 may depend on local statutes and the particular type of glass does not affect the present invention.

The frame of the window of FIG. 1 includes frame elements 14, 16, 18 and 20 preferably formed of a wood. Wood is chosen as the preferred material for use as the frame because of its low thermal conductivity. The frame elements 14 and 18, and 16 and 20, are substantially respectively identical with one another. The vertically disposed frame elements 14 and 18 are provided with longitudinally extending grooves 22 and 24, respectively. Threaded fastener receiving holes are suitably formed in the frame elements 14 and 18 at opposite ends thereof to receive threaded fasteners such as bolts 26.

The horizontally disposed frame elements 16 and 20 are provided with longitudinally extending grooves 28 and 30, respectively. Extending outwardly from opposite ends of the frame element 16 are tongues 32 and 34 which, in the assembled form of the window construction, fit within the grooves 22 and 24 of the frame elements 14 and 16, respectively. Inwardly of each of the tongues 32 and 34, slots 36 and 38 are formed to receive a nut 40 which is adapted to align with holes in the tongues 32 and 34 positioned to receive the bolt 26 when the frame is assembled. The frame element 20 also has outwardly extending tongues 42 and 44 which fit within the grooves 22 and 24 of the frame elements 14 and 18, and have holes formed therein which are adapted to receive the bolt 26 when the frame is assembled. Slots (not illustrated) are formed in the frame element 20 to receive the nuts 40 in the same manner as the slots 36 and 38 of the frame element 16. It will be understood that the slots formed in the frame element 16 and 20 to receive the nuts 40 are fashioned such that when the nuts are disposed therewithin, the nuts are prevented from rotating and are snugly seated.

An elongate gasket strip 46 of an elastomeric material being contoured to form an airtight contact around the marginal edge portions of the facing surfaces of the glass planes 10 and 12 is placed around the panes 10 and 12. It has been found desirable to blunt the sharp edges of the cut glass panes 10 and 12 by use of an abrasive material such as fine grained tungsten carbide, for example. This will enable the handling of the glass panes without accidental cutting of the elastomeric strip 46 or the assembler's hands. Before final assembly, it is advantageous to insert a quantity of a desiccant, such as silica gel, for example, between the facing surfaces of the glass panes 10 and 12 to absorb moisture entrained in the air therebetween to thereby militate against a fogging condition caused by condensation of the moisture in the entrapped air.

In order to facilitate the formation of a substantially right angle turn of the strip 46 at the corners of the glass panes 10 and 12, a transverse slit 48 is formed in the outer surface of the strip. The opposite ends of the strp 46, which are joined to complete the encircling seal, are typically beveled and glued together to form a scarf joint 49.

Finally, the frame elements 14, 16, 18 and 20 are placed over the elastomeric strip 46 and the marginal edges of the glass panes 10 and 12 in such a fashion that the strip 46 and the marginal edges of the panes are received snugly within the grooves 22, 24, 28 and 30. During the assemblage of the frame elements over the marginal edges of the glass panes 10 and 12 and the strip 46, it will be understood that the width dimension of the grooves 22, 24, 28 and 30 are such that the strip 46 must be compressed to assure that an airtight seal is formed between the opposing side walls of the strip and the adjacent inner facing surfaces of the marginal edges of the glass panes 10 and 12. Then the bolts 26 are inserted in the holes formed in the frame elements 14 and 18 are tightened to draw the tongues 32 and 34, and 42 and 44 of the frame elements 16 and 20 snugly within the grooves formed in the associated frame elements 14 and 18. After the bolts 26 are tightly secured and fastened within the nuts 40, the window construction is completed.

It will be observed that in the event that it is ever necessary to disassemble the window to clean the interior surfaces of the glass panes 10 and 12, it is necessary only to loosen the four bolts 26 until they are disengaged from their respective nut 40 and pull the frame elements 14, 16, 18 and 20 apart.

Referring to FIGS. 2 through 6, there is illustrated another embodiment of the invention wherein the window construction includes a pair of panes of glass 50 and 52 which are of substantially identical dimensions.

The frame of the window consists of frame elements 54, 56, 58 and 60, preferably formed of wood because of the low thermal conductivity thereof. It will be noted that the vertically disposed elements 54 and 58 are identical with one another; and the horizontally disposed elements 56 and 60 are substantially identical with one another with the exception of the bottom frame element having a cavity formed in the bottom wall portion thereof, as will be explained in greater detail hereinafter.

The frame elements 54 and 58 are provided with longitudinally extending grooves 62 and 64, respectively. Threaded fastener receiving holes 65 are suitably formed in the frame elements 54 and 58 at opposite ends thereof to receive threaded fasteners such as bolts 66.

The horizontally disposed frame elements 56 and 60 are provided with longitudinally extending grooves 68 and 70, respectively. Extending outwardly from opposite ends of the frame element 56 are tongues 72 and 74 which, in the assembled form of the window construction, fit within the grooves 62 and 64 of the frame elements 54 and 58, respectively. Inwardly of each of the tongues 72 and 74, slots 76 and 78 are formed to receive nuts 80 which are adapted to align with holes 65' in the tongues 72 and 74 positioned to receive the bolts 66 when the frame is assembled. Only the hole 65' in the tongue 72 is clearly illustrated in drawings in FIGS. 5 and 6. The frame element 60 also has outwardly extending tongues 82 and 84 each of which is provided with a hole 65' formed therein adapted to align with the bottom holes 65 in the frame elements 54 and 58 in the assembled form. The aligned holes 65 and 65' are adapted to receive the bolts 66 during the assembly procedure. Slots (not illustrated) are formed in the frame element 60 to receive the nuts 80 in the same manner as the slots 76 and 78 of the frame element 56.

An elongate gasket strip 86 of an resilient elastomeric material being contoured to form an airtight sealing contact around the marginal edge portions of the facing surfaces of the glass panes 50 and 52 is placed around the frames 50 and 52. It has been found desirable to blunt the sharp edges of the cut glass panes 50 and 52 by the use of an abrasive material such as fine grained tungsten carbide, for example. This will enable the handling of the glass panes without accidental cutting of the elastomeric strip 86 or the assembler's hands. The elastomeric strip 86 is preferrably generally T-shaped in cross-section wherein the outer surface of the base of the Tee is somewhat rounded or bulged and the upper head of the Tee is to be disposed within its respective groove in the frame elements. The outer rounded surfaces of the base of the Tee are designed to be in facing contact with the inner facing surfaces of the marginal edges of the glass panes 50 and 52, while the inner surfaces of the upper head of the Tee may provide cushioned contact for the edges of the glass panes 50 and 52 in the manner clearly illustrated in FIG. 4. In order to facilitate the formation of a substantially right angle turn or corner for the strip 86, a transverse slit 88 is formed in the outer surface of the strip in the manner clearly shown in FIG. 5. While it has been mentioned that the strip 86 is formed of an elastomeric material, it must be understood that satisfactory results could be obtained by making the strip of a composite material having a cloth or fabric backing. Further, the strip 88 could be formed as a hollow member provided with means for inflating the member to maintain the desired pressure at it expands against the facing surfaces of the glass. The elastomeric strip provides a complete shock absorbing mounting for the panes of glass and will compensate for slight dimensional deviations in the frame elements to produce a full floating mounting for the glass panes 50 and 52. Typically, the opposite ends of the strip 86, which are joined to complete the encircling seal, may be beveled and glued together to form a scarf joint 89.

In the embodiment illustrated in FIGS. 2 through 6, a set of muntins is inserted in the space between the facing surfaces of the glass panes 50 and 52. The set of muntins is comprised of a horizontally extending member 90 and vertically extending members 92, 94, 96 and 98. The vertically extending members 92 and 94 are coupled together by a relatively short hollow tube 100 which extends through the member 90, while the vertically extending members 96 and 98 are coupled together by a relatively short hollow tube 102 which extends through the horizontally extending member 90. At the upper end of the vertically extending muntin member 92 is a hole 104 which opens in a direction opposite to the muntin member 98 and communicates with the lower end of the tube 100, while the upper end of the tube communicates with a hole 106 in the vertically extending member 94 which opens in the same direction as the hole 104. The upper end of the vertically extending muntin member 94 is provided with a hole 108 which extends completely through the muntin 94. The vertically extending muntin member 96 has a hole 110 extending completely therethrough at the upper end thereof, while the lower end has a hole extending inwardly from the side opposite the muntin 94 and communicates with the upper end of the hollow tube 102. The lower end of the hollow tube 102 communicates with a hole 114 extending inwardly of the muntin 98 from the opposite side of the muntin 98. The lower end of the muntin 98 has a hole 116 extending completely therethrough. The function of the above described holes will be explained in greater detail hereinafter.

Extending through the elastomeric strip 86, in the region between the vertically extending muntin 92 and the vertically extending portion of the strip 86, is an aperture 117. The aperture is provided with an inwardly extending plug member 118. The strip 86 is further provided with an aperture 120 which is located, in the assembled form, between the vertically extending muntin members 92 and 98. A desiccant conveying tube 122 associated with a desiccant container 124, typically in the form of a flexible wall bladder, communicates with the interior zone of the window structure through the aperture 120 in the sealing strip 86. The plug 118, the conveying tube 122 and the desiccant containerr 124 may be suitably housed within a cavity formed within the lower portion of the frame member 60. A perforate cover 126 may be used to protect the container 124 during movement of the window. It will be understood that suitable apertures are formed in the frame element 60 to receive the plug 118 and the tube 122.

Finally, the frame elements 54, 56, 58 and 60 are placed over the elastomeric strip 86 and the marginal edges of the glass panes 50 and 52 in such a fashion that the elastomeric strip 86 and the marginal edges of the panes 50 and 52 are snugly received within the grooves 62, 64, 68 and 70. During the assemblage of the frame elements over the marginal edges of the glass panes 50 and 52 and the strip 86, it will be understood that the width dimension of the grooves 62, 64, 68 and 70 are such that the facing surfaces of the marginal edge portions of the panes 50 and 52 are urged into continuous contact with the outer rounded surfaces of the base of the T-shaped cross-section of the elastomeric strip 86 to assure that an airtight seal is formed between the opposing side walls of the strip and the adjacent interfacing surfaces of the marginal edges of the glass panes 50 and 52. Only enough pressure has to be applied to assure continuous contact between the strip 86 and the inner surfaces of the glass panes 50 and 52.

Then the bolts 66 are inserted into the holes 65 and the aligned holes 65' to draw the tongues 72 and 74, and 82 and 84 of the frame elements 56 and 60 snugly within the grooves formed within the associated frame elements 54 and 58. After the bolts 66 are tightly secured and fastened within the nuts 80, the window construction is completed. However, as a final step in flushing the interior space between the facing surfaces of the glass panes 50 and 52, the plug 118 and the container 124 are removed and an inert and dry gas such as argon is introduced into the space and assumes a path of travel generally in the direction of the arrows in FIG. 2. The normal course of travel of the flushing gas is shown by arrows in FIG. 2 where the course of travel of the gas from the plug 118 is through the hole 104 in the muntin 92, through the hollow tube 100 and out through the hole 106 in the muntin member 94. The gas then travels through the hole 108 in the upper portion of the muntin 94 into the space between the muntins 94 and 96, through the hole 110 and thence downwardly to the hole 112, through the hollow tube 102 exiting through the hole 114 in the muntin 98. Thence, the gas is caused to travel through the hole 116 in the lower portion of the muntin 98 into the zone between the muntins 92 and 98 and through the tube 122. It will be understood that while the muntins may not form a sealing contact with the interior surfaces of the glass, they do aid in directing the flow of flushing gas as shown by the arrows in FIG. 2. When the space has been adequately flushed, the plug 118 is reinserted and the container 124 is reassembled thereby sealing the interior space between the glass panes 50 and 52. The window construction is completed and ready for installation.

In operation of the described window construction, as temperature and pressure conditions change, the relative pressures between the glass panes 50 and 52 vary causing the air in the sealed space to be admitted into and exhausted from the desiccant container 124 through the tube 122 to thereby continuously and automatically treat the interior and withdraw moisture therefrom and thereby militates against any fogging of the window for many years. Also, the flexible walled container 124 provides pressure equalization between the interior of the window and the atmosphere to eliminate differentials in pressure across the seal line of contact between the gasket 86 and the interior faces of the glass panes 50 and 52 to thereby militate against the tendency to leak. The container 124 would be effective in this regard even if no desiccant were present.

While mentioned has been made throughout the above description of the use of the muntin members, it will be understood that other enclosures could be included in the space between the glass panes such as, for example, venetian blinds, art objects, and light filtering devices.

In order to insure that the gasket material of the gaskets 46 and 86 of the illustrated embodiments assumes a dimensionally stable right angle corner configuration, for example, it may be found desirable to attach a narrow sheet metal corner strip to the back of the gasket material after the corner slit has been made. Such a construction will reinforce the corner of the gasket, as well as prevent the slit from increasing in depth and maintain the form of the gasket in the corner region.

It will be further understood that while the embodiments of the invention hereinabove described relate to window constructions, the inventive concepts may be likewise advantageously used in other opening closure structures such as insulating door constructions.

From the above description, it is evident that the invention may be practiced otherwise than as specifically illustrated and described. Accordingly, it is to be understood that the above disclosure it to be read as illustrative of the invention and not in a limiting sense.

What I claim:

1. A hollow double transparent closure comprising:
    a pair of substantially parallel spaced apart panes of transparent sheet material;
    resilient gasket means disposed between the marginal edges of the facing surfaces of said panes, said gasket means having curved compressible faces engaging the adjacent faces of said spaced apart panes and defining an enclosed volume between the facing surfaces of said panes;
    a frame circumscribing the periphery of said panes, said frame including elements of a material of a low thermal conductivity containing grooves for receiving the marginal edges of said panes and having walls of the grooves engaging and urging said panes toward one another to compress said gasket means an amount sufficient to produce an airtight sealing contact between the marginal edges of the facing surfaces of said panes and said gasket means; extending tongues on alternate ones of the elements of said frame fitted within the grooves of the adjacent other ones of the elements of said frame;
    flushing gas directing means in the enclosed volume between said facing surfaces of said panes, said directing means being spaced across the planes of the respective panes to sub-divide the enclosed volume between the facing surfaces of said panes; and
    fastener means for interconnecting the grooved elements of said frame to form a rigid structure.

2. The invention defined in claim 1 wherein said gas directing means is in the form of an array of apertured muntin members.

3. The invention defined in claim 2 including longitudinal tubing interconnecting ones of said muntin members, and porting means for providing communication between said tubing and selected sides of said muntin members.

* * * * *